United States Patent Office

3,729,329
Patented Apr. 24, 1973

3,729,329
NONAQUEOUS LUBRICANT-BINDER SYSTEM FOR REFRACTORY RAMMING MIXES
Martin Morris, Pittsburgh, and George Ronald Henry, Bethel Park, Pa., assignors to Dresser Industries, Inc., Dallas, Tex.
No Drawing. Filed July 9, 1971, Ser. No. 161,350
Int. Cl. C04b 55/04
U.S. Cl. 106—58    4 Claims

ABSTRACT OF THE DISCLOSURE

A nonaqueous lubricating-bonding system for refractories, especially basic refractories, of increased storage life, said system including a lubricating oil in combination with a metallic stearate.

---

This invention relates to compositions particularly suited for the formation of refractory monoliths. In one aspect, this invention relates to refractory linings of the type found in oxygen converter vessels.

In certain metallurgical processes, such as in the oxygen steelmaking process which has been variously designated as the LD process, oxygen Bessemer process, oxygen converter process or "Kaldo" process, the basic furnace structure is comprised of a metal skin or shell having a refractory lining interiorly thereof to define the furnace space in which the process is carried out. Generally, the refractory lining of these oxygen steeelmaking vessels is comprised of an inner "working" lining of such as tar bonded, chemically bonded, or burned basic brick, an outer lining adjacent the inner wall of the metal shell usually of a burned magnesite brick, and an intermediate layer.

The intermediate layer is usually monolithic, and is formed by such as ramming of a refractory composition in situ. The intermediate layer can vary in thickness, depending on the vessel being lined and the operating parameters to which the lining is to be subjected. An example of a prior ramming mix, which could be used to form this intermediate layer, is a dead burned dolomite or magnesite or mixture of dolomite and magnesite with additions of such as creosote, furfurala, pitch, tar or the like, as the binder.

The invention disclosed in U.S. Pat. No. 3,556,822 (assigned to the present assignee) has proven to be quite satisfactory for the above purposes. Now, however, it has become evident, particularly (1) under certain extreme temperature conditions, (2) when subjected to rough handling, and (3) due to uncontrollable chemical variations in the residual material which the unsaturated pitch is, that the bonding system of the patent will "set up" in its shipping container or will lose some of its excellent workability. It is, thus, a primary object of this invention to provide for a new bonding system which will give extended storage life and workability for the type mixes disclosed and claimed in U.S. Pat. No. 3,556,822.

Briefly, according to one aspect of this invention, there is provided a basic refractory ramming mix or brick made from a batch comprised of size-graded basic refractory aggregate and a novel nonaqueous, bonding system. This bonding system is comprised of a lubricating oil in combination with a metallic stearate. Preferably, the total bonding system amounts to between about 3 to 8 parts, by weight, for each 100 parts, by weight, of basic refractory aggregate, although 2 to 12 parts is workable. The preferred basic refractory aggregate is selected from the group consisting of dead burned dolomite, dead burned magnesite and sometimes mixtures thereof. In addition, hard burned lime or chrome ore can be used in combination with dead burned dolomite and dead burned magnesite.

The prior art has long recognized the use and advantagages of various petroleum products, for instance, various oils for lubricating and bonding numerous types of mixes including the basic type mixes which are the subject of our invention. The action of the oil is apparently primarily to coat the individual grains with a film of oil, and to lubricate the grains and facilitate their movement against one another (i.e., compaction), during the mixing and forming operations. The oil, by reason of its cohesive property, also serves to preliminarily bind together the refractory grains and thus contributes to the successful forming of the composition.

However, one of the main problems of the lubricating oil system is that adequate green strength is not developed in the nonplastic refractories and problems are encountered during the forming operation.

We have discovered, however, that we can take advantage of the useful features of the lubricating oil, yet obtain suitable green strength by using a mixture of lubricating oil and a metallic stearate. The oil and stearate mixture serve a dual purpose—the oil provides lubrication necessary for achieving required rammed densities, while the stearate functions as a binder. Mixes containing this binder system have excellent ramming and storage properties. In addition, this lubricant-binder system is nonaqueous. It is well known to those skilled in the art that water is an undesirable constituent with mixtures of basic refractory materials because of hydration and subsequent danger of cracking.

Further features of our invention will become clear from an examination of the following examples which are indicative of comparative laboratory testing of mixes according to this invention.

Mix A: 100 parts magnesite, 3½ parts of partially neutralized soybean pitch
Mix B: 100 parts magnesite, 3 parts of nondetergent 40 weight motor oil and ½ part magnesium stearate powder Both mixes had excellent ramming properties made up for storage tests at room temperature and at 140° F.

Appearance (as stored in polyethylene lined sacks)
After storage, 140° F., 5 days:

Mix A: Slightly dried and stiffer; partially compacted but easily broken up
Mix B: No change
After storage at room temperature for 8 weeks:
Mix A: Tight compaction, difficult to loosen
Mix B: No change While the mix above discloses the use of magnesite grain, equally satisfactory are mixes of dead burned dolomite and magnesite, such as:

Mix C: 60 parts dolomite, 40 parts magnesite, 2 parts carbon black, 3 parts of nondetergent 40 weight motor oil and ½ part magnesium stearate powder This mix had superior strength properties compared to similar mixes containing a partially neutralized soybean pitch binder. In addition, the mix exhibited excellent storage life, being very workable after seven weeks storage at room temperature.

In preparing refractory batches using this lubricant-binding system, the lubricating oil is first mixed with the refractory aggregate and then the magnesium stearate is added to the mix.

As is well known to those skilled in the art, a stearate is a salt of a fatty acid. While the use of a magnesium stearate ($Mg[C_{18}H_{35}O_2]_2$) has been disclosed in the foregoing examples, other metallic stearates such as aluminum, calcium, sodium and zinc were evaluated and found to be equally effective.

The oil, which provides the lubrication necessary for achieving required rammed densities can be any oil which provides adequate lubrication with economics and availability being a determining factor in which particular oil is to be used. As stated previously, we have found a nondetergent 40 weight common motor oil to work satisfactorily.

Having thus described the invention in detail and with sufficient particularity to enable those skilled in the art to practice it, what is desired to have protected by Letters Patent is set forth in the following claims.

The embodiments of the invention in which an exclusive property or privilege is claimed are defined as follows:

1. In refractory batches bonded with a combination of nonaqueous materials, which batches consist essentially of about 100 parts, by weight, of non plastic, basic refractory, and on the order of 2 to 12 parts, by weight, of the bond material, the improvement comprising said bond material including a combination of lubricating oil and a metallic stearate.

2. The batches of claim 1 in which the refractory grain is comprised of magnesite or dolomite or mixtures of dolomite and magnesite.

3. The batches of claim 1 in which the lubricating oil is a nondetergent 40 weight motor oil.

4. The batches of claim 1 in which the metallic stearate is selected from a group consisting of magnesium, aluminum, calcium, sodium and zinc stearates.

References Cited
UNITED STATES PATENTS

| | | | |
|---|---|---|---|
| 2,584,475 | 2/1952 | Lecuir | 106—58 |
| 2,501,336 | 3/1950 | Hyde et al. | 106—58 |
| 3,556,822 | 1/1971 | Henry et al. | 106—58 |

JAMES E. POER, Primary Examiner

U.S. Cl. X.R.

106—61, 63